Dec. 31, 1940.   P. C. SEAHOLM   2,226,585
DAMMING ATTACHMENT
Filed April 7, 1938
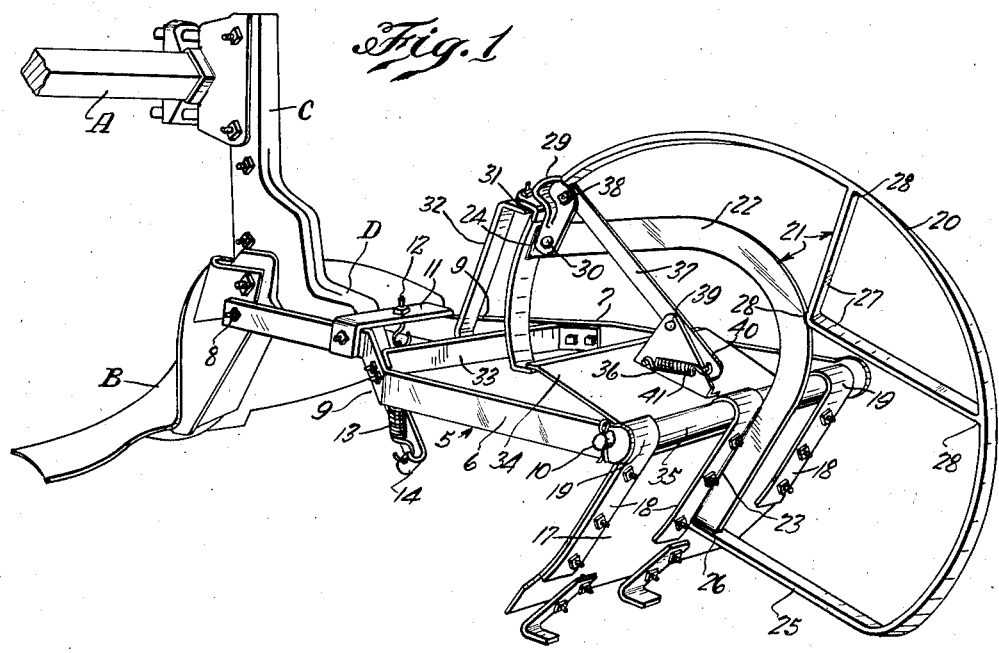
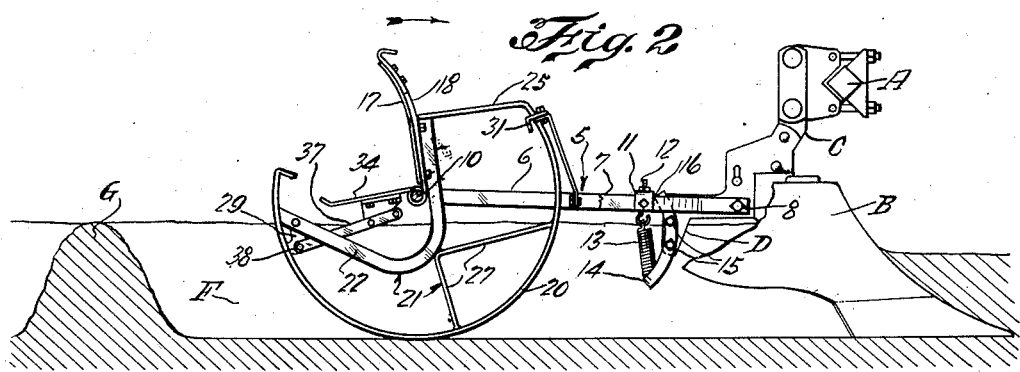
INVENTOR.
PAUL C. SEAHOLM
BY
ATTORNEY.

Patented Dec. 31, 1940

2,226,585

UNITED STATES PATENT OFFICE 2,226,585

DAMMING ATTACHMENT

Paul C. Seaholm, Moline, Ill., assignor to Minneapolis-Moline Power Implement Company, Minneapolis, Minn., a corporation of Delaware Application April 7, 1938, Serial No. 200,650

9 Claims. (Cl. 97—55)

This invention relates to improvements in damming devices and attachments for furrow forming implements.

Damming devices of the kind here in mind are employed, in connection with a furrow forming implement such as a lister plow, to travel along the furrow and scrape up soil therefrom to form dams which extend transversely across the furrow and define basins wherein the water may settle and soak into the soil. The device for this purpose thus includes a frame assembly supported from the furrow forming implement in a trailing position over the furrow, a tool arranged in the frame assembly and normally extended in scraping position into the furrow, and means for intermittently releasing the tool so that the pile of earth scraped up by the tool may be deposited in the furrow to provide the dam therein. In order, then, to cause the said tool to clear the accumulated pile of earth, and be carried over into its next scraping position most effectively, some means must be employed to control its movements, and it is this operation, and the means for carrying the same into effect, with which my invention is concerned.

The primary object of my invention, therefore, is to provide means for rotatably supporting the dam forming tool of a damming device of this character in such manner that the tool, when released from scraping position, will be carried over the accumulated dam and restored to scraping position for forming the next dam. Another object is to provide an assembly of this kind wherein the frame extended from the implement is supported at its free extremity by the tool and by a wheel device with which the tool is connected, in such manner that, when the tool is released from scraping position, the wheel will carry the tool through one complete revolution under influence of forward movement of the wheel in the furrow to thereby carry the tool over the dam and restore the tool to initial position.

The foregoing and other objects, together with means whereby they may be carried into effect, will be made apparent in the course of the following detailed specification, reference being had to the accompanying drawing wherein:

Fig. 1 is a perspective view of my damming device as mounted behind a lister plow beam assembly.

Fig. 2 is a side elevation, on a reduced scale and partially in longitudinal section, of the assembly of Fig. 1 in use, this view showing the device in operation in a furrow and as having just cleared a dam formed in the furrow.

It may here be stated that the present application is directed to novel subject matter not specifically claimed in the pending application, Serial Number 189,583 filed February 9, 1938, by John R. Orelind for a Damming attachment.

Referring now more particularly and by reference characters to the drawing, A designates the beam of a conventional implement from which the plow bottom B is supported by the hitch C. This assembly constitutes a single gang or single furrow forming unit of a lister plow, but it is to be understood that the damming device as herein provided may be employed in connection with any suitable furrow forming implement and with each gang thereof.

The damming attachment per se comprises the frame assembly or beam designated generally at 5 made up of fore and aft extended side bars 6 and 7 which embrace the hitch C and are pivotally connected at their frontal ends thereto to form a draft connection by the transversely extended bolt 8. From the hitch C the side bars 6 and 7 extend rearwardly as shown and they are spread apart, as at 9, immediately behind the hitch so that their free rear end portions are spread widely apart to accommodate the transverse, horizontally axised axle or shaft 10. A yoke 11 spans the side bars 6 and 7 immediately to the rear of the hitch C and carries an eye bolt 12 at a medial point to which the upper end of the retractile coil spring 13 is connected. The lower end of the spring is then connected to a stop bar 14 which is bolted at 15 in a foot or tail block D of the hitch C and supports the spring in such manner that it normally tends to pull the rear portion of the frame downwardly. This action is limited, to the point that the frame 5 stands normally in substantially horizontal position longitudinally, by contact of the upper extremity of the stop bar 14 with the yoke 11 as indicated at 16. However, the spring 13 will permit yielding upward floating motion of the frame 5 as will presently appear.

The dam forming tool is designated generally at 17 and same may comprise the substantially rectangular blade having several flat straps 18 secured to its rear side and formed at their extremities into eyes 19 by which they are pivotally supported on the axle 10. The tool is thus horizontally axised transversely to its direction of travel with the frame assembly and it may, accordingly, depend into the furrow for scraping action therein.

For supporting the tool 17, and other functions hereinafter described, I provide a wheel or rocker device or carrier 20 which is rigidly connected to the tool to turn co-axially therewith upon the axle 10. This wheel is sector-shaped, is more than semi-circular, and has a segmental portion broken out in order thus to clear the tool 17 which extends radially with respect to the device as a whole. The wheel device 20 thus may be considered as a broken or open wheel and may be so referred to hereinafter. Accordingly, there is formed a considerable space at the frontal side of the tool 17 between said tool and the adjacent end of the wheel as clearly shown. The wheel is supported in this manner by means of a spoke structure designated generally at 21 made up of a U-shaped bar 22, one end of which is welded edgewise along the rear of the center strap 18 as noted at 23 and the other end of which is turned forwardly and welded at 24 to the frontal end portion of the broken wheel. The rear forwardly turned portion 25 of the wheel is then welded at 26 to the normally lower extremity of the bar 22. Bracing between the medial portion of the wheel and the bight of the bar 22 is provided by the V-shaped bar 27 welded at its extremities 28 to these parts as shown. The wheel and spoke structure thus recited serves to mutually reinforce the parts or, in other words, the bars 22 and 27 brace and reinforce the broken wheel 20 while the wheel itself reinforces the bars to thus form an extremely rigid construction. This particular arrangement of the supporting structure for the wheel 20 is of further advantage in that it provides clearance and mounting assembly for the tool release means hereinafter described, but it is understood that any suitable supporting structure may be provided as may be found desirable. The frontal portion of the wheel has its extremity upset or bent over, as shown, so that this end of the wheel will not dig into the earth as the wheel turns.

For the purpose of locking the assembly of the tool 17 and wheel 20 in the position just described, there is provided a latch or dog 29 pivoted at 30 to the frontal end of the bar 22 and having engagement with a stop 31 supported atop a bar 32 which, in turn, is supported by a cross bar 33 provided in the frame 5 as shown. This arrangement is such that the latch 29, while in engagement with the stop 31, will prevent any rotation of the wheel 20 in a forward direction such as would allow the tool 17 to swing rearwardly and upwardly out of its working or scraping position. However, by pulling the latch 29 rearwardly, it may be disengaged from the stop 31 to permit said movement of the parts.

In the device as shown in the drawing the latch 29 is controlled by the accumulation of earth scraped up by the tool 17 through action of a trip plate 34 pivotally engaged with the axle 10 at its rear end 35 and normally extending forwardly therefrom. This trip plate 34 carries a bracket 36 on its upper side and to the upper frontal corner of this bracket is fulcrumed a latch release bar 37 which extends forwardly and upwardly to the latch 29 where it is pivotally connected at the point 38. The rear extremity of the latch release bar, which extends past the fulcrum point 39 as at 40, is connected by a retractile coil spring 41 to a frontal lower portion of the bracket 36 and this spring normally tends to so dispose the parts that the points 38 and 39 are in radial alignment with the axle 10. In this position the latch 29 is held in engagement with the stop 31 and the entire rotatable assembly is locked.

Referring now with particularity to Fig. 2 of the drawing, it will be evident that as the plow bottom B moves forwardly, the damming device will be carried along the furrow F as it is formed and, with the tool 17 in scraping or working position, the sides of the furrow will be lightly scraped to accumulate a quantity of soil ahead of the tool. This soil piles up ahead of the tool and bears upwardly against the underside of the trip plate 34 and finally swings the same upwardly on the axle 10 to the point that the alignment of the latch bar 37 is broken and a rearward pull occurs on this bar. This action frees the latch 29 from the stop 31 whereupon the rearward pressure of the earth upon the tool 17 at once urges the same rearwardly and upwardly and initiates rotational movement of the wheel 20. Immediately then the frontal end of the wheel 20 contacts the furrow bottom and rolls therealong until the tool 17 clears the dam and finally completes one revolution about the axle 10. As this assembly returns to initial position, the latch 29 re-engages the stop 31, restoring the tool 17 to its working position ready to accumulate another dam and locking the assembly in this position until the next dam builds up to the height required to release the tool. The dam as formed in the furrow is indicated at G.

It will be evident from the foregoing that the wheel 20 serves to support and carry the tool 17 entirely over the dam in response to forward travel of the implement and that, during this operation at least, the wheel further acts to support the rear of the entire damming device independently of the implement. The wheel thus serves two distinct important functions essential in the operation of the device as a whole.

In connection with the operation of the machine as thus briefly described, it will be further noted that the wheel 20, being "broken" or open as described, provides an unobstructed clearance at the frontal side of the tool 17 not only for the free play of the trip plate 34, but also for the accumulation of the earth ahead of the tool and beneath this plate. The fact that the wheel 20 as described thus has no actual contact with the bottom of the furrow at the outset of each rotation of the assembly when released is of no disadvantage since the drag of the dam upon the tool 17 when same is freed will initiate a sufficient part of the movement so that the frontal end portion of the wheel will actually contact the furrow bottom before the tool completely clears the dam. There can be no failure, then, in the complete cycle of operation necessary to restore the tool to its working position. However, due to the fact that but a single scraping tool is employed in my device, it is necessary that the wheel 20 be greater than a half circle in shape and extent in order that the wheel may carry the blade through a complete revolution and restore it to working position as described.

It is understood that I may make changes in the specific structure herein disclosed, provided that such changes fall within the spirit of the invention and the scope of the appended claims.

Having thus fully described the invention, what I claim as new, and desire to secure by Letters Patent, is:

1. A damming device for operation behind a plow, the same comprising a spring depressed frame supported at its frontal end by the plow, a tool mounted in the frame for operation in the furrow as formed by the plow to gather earth in spaced dams, and arcuate wheel acting means for supporting the frame in its travel movement between dams.

2. In a damming device for operation behind an implement in a furrow, a frame assembly connected to the implement, a blade rotatably mounted adjacent one margin in the frame assembly on a transverse and horizontal axis, to depend into the furrow and scrape up earth in the form of dams therein, a curved carrier member effective to transport the blade between dams during travel movement in the furrow, and spring means producing down pressure on the blade and carrier member in the furrow.

3. A damming attachment for operation in a furrow behind an implement, comprising a frame connected to the implement, a blade pivotally mounted in the frame and adapted normally to depend into the furrow for scraping up earth in the form of transverse dams therein, a curved wheel device supported coaxially with the pivotal axis of the blade for rolling movement in the furrow to thereby transport the blade between dams, and a generally U-shaped member secured by one leg to the back of the blade and to one end of the wheel device and secured at its other leg to the other end portion of the wheel device for supporting the same from the blade.

4. A damming attachment for operation in a furrow behind an implement, comprising a frame connected to the implement, a blade pivotally mounted in the frame and adapted normally to depend into the furrow for scraping up earth in the form of transverse dams therein, a curved wheel device supported coaxially with the pivotal axis of the blade for rolling movement in the furrow to thereby transport the blade between dams, a generally U-shaped member secured by one leg to the back of the blade and to one end of the wheel device, and secured at its other leg to the other end portion of the wheel device for supporting the same from the blade, and a brace member extended between intermediate portions of the U-shaped member and wheel device.

5. A damming attachment for operation in a furrow behind an implement, comprising a frame connected to the implement, a blade pivotally mounted in the frame and adapted normally to depend into the furrow for scraping up earth in the form of transverse dams therein, an arcuate wheel device supported coaxially with the pivotal axis of the blade for rolling movement in the furrow to thereby transport the blade between dams, a generally U-shaped member secured by one leg to the back of the blade and to one end of the wheel device, and secured at its other leg to the other end portion of the wheel device for supporting the same from the blade, and a latch pivotally mounted on the said U-shaped member adjacent the wheel device and having releasable locking engagement with the frame.

6. A damming device comprising a draft member, a spring depressed frame supported at its frontal end by the draft member, a tool mounted in the frame for operation in the furrow to gather earth in spaced dams, and curved wheel acting means for supporting the frame in its travel movement between dams.

7. A damming device for operation in a furrow and comprising a frame, a device rotatably mounted in the frame, said device including a generally upright scraper blade adapted to accumulate earth to form a dam in the furrow in front of the blade and with such accumulated earth being supported in the furrow in advance of the blade while the dam is being formed, means normally preventing rotation of the device while the blade is in dam forming position, means disposed forwardly of the dam when in such position for contact with the dam thus formed, and adapted to be raised by the dam when the latter reaches a predetermined height, to release the device and permit it to rotate, and curved wheel acting means adapted to support the device as it travels between dams.

8. A damming device for operation in a furrow and comprising a frame, a device rotatably mounted in the frame, said device including a generally upright scraper blade adapted to accumulate earth to form a dam in the furrow in front of the blade and with such accumulated earth being supported in the furrow in advance of the blade while the dam is being formed, means normally preventing rotation of the device while the blade is in dam forming position, means disposed forwardly of the dam when in such position for contact with the dam thus formed, and adapted to be raised by the dam when the latter reaches a predetermined height, to release the device and permit it to rotate, curved wheel acting means adapted to support the device as it travels between dams, and spring means controlling the effective weight of the device as it operates in the furrow.

9. A damming device for operation in a furrow and comprising a frame, a device rotatably mounted in the frame, said device including a generally upright scraper blade adapted to accumulate earth to form a dam in the furrow in front of the blade and with such accumulated earth being supported in the furrow in advance of the blade while the dam is being formed, means normally preventing rotation of the device while the blade is in dam forming position, means disposed forwardly of the dam when in such position for contact with the dam thus formed, and adapted to be raised by the dam when the latter reaches a predetermined height, to release the device and permit it to rotate, curved wheel acting means adapted to support the device as it travels between dams, and spring means controlling the effective weight of the device as it operates in the furrow, said spring means being operative to exert a down pressure on the device.

PAUL C. SEAHOLM.